United States Patent [19]
Pick et al.

[11] Patent Number: 5,145,145
[45] Date of Patent: Sep. 8, 1992

[54] PILOT OPERATED ELECTRICALLY ACTUATED VALUE ASSEMBLY

[75] Inventors: James Pick, Elk Grove; Robert Cooper, West Dundee; Richard Donner, Hanover Park, all of Ill.

[73] Assignee: Eaton Corporation, Cleveland, Ohio

[21] Appl. No.: 667,138

[22] Filed: Mar. 11, 1991

[51] Int. Cl.⁵ ............... F16K 31/06; F16K 51/00
[52] U.S. Cl. ................... 251/30.03; 251/30.05
[58] Field of Search ............ 251/30.01, 30.03, 30.04, 251/129.17, 30.05

[56] References Cited

U.S. PATENT DOCUMENTS 4,178,573 11/1979 Swanson .......... 251/30.03 X
4,534,537 8/1985 Zukausky .......... 251/30.03
4,981,155 1/1991 Pick et al. .......... 251/30.03 X
4,987,920 1/1991 Donner .......... 251/30.03 X Primary Examiner—Martin P. Schwadron
Assistant Examiner—Kevin L. Lee
Attorney, Agent, or Firm—R. A. Johnston

[57] ABSTRACT

A pilot operated electromagnetically actuated valve having a flexible diaphragm main valve operator with a rigid insert forming the pilot valve seat and passage. The pilot valving chamber cover serves as an armature pilot valve guide and also has plural spaced ribs engaging and guiding movement of the rigid insert and pilot valve seat. A separate inlet passage having an annular filter formed by circumferentially spaced grooves and a resilient flange provided on a disc member inserted in the valve inlet flow to a remote pilot bleed hole in the cover for supplying the pilot valving chamber.

9 Claims, 2 Drawing Sheets

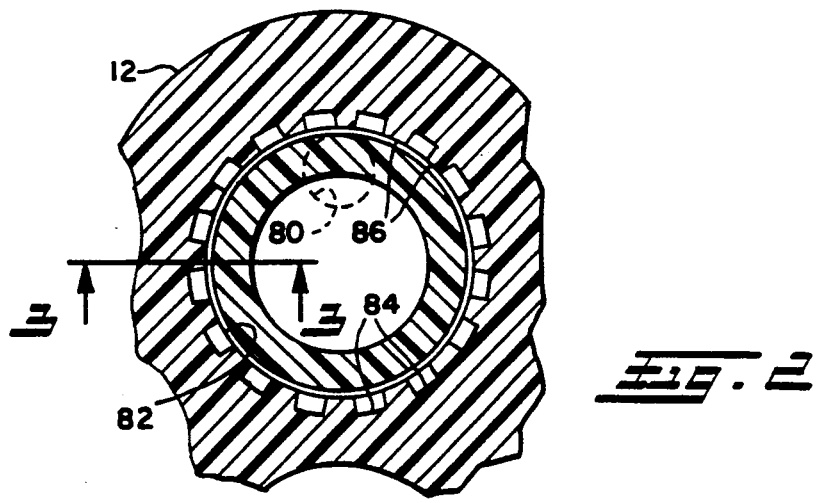
Fig. 2
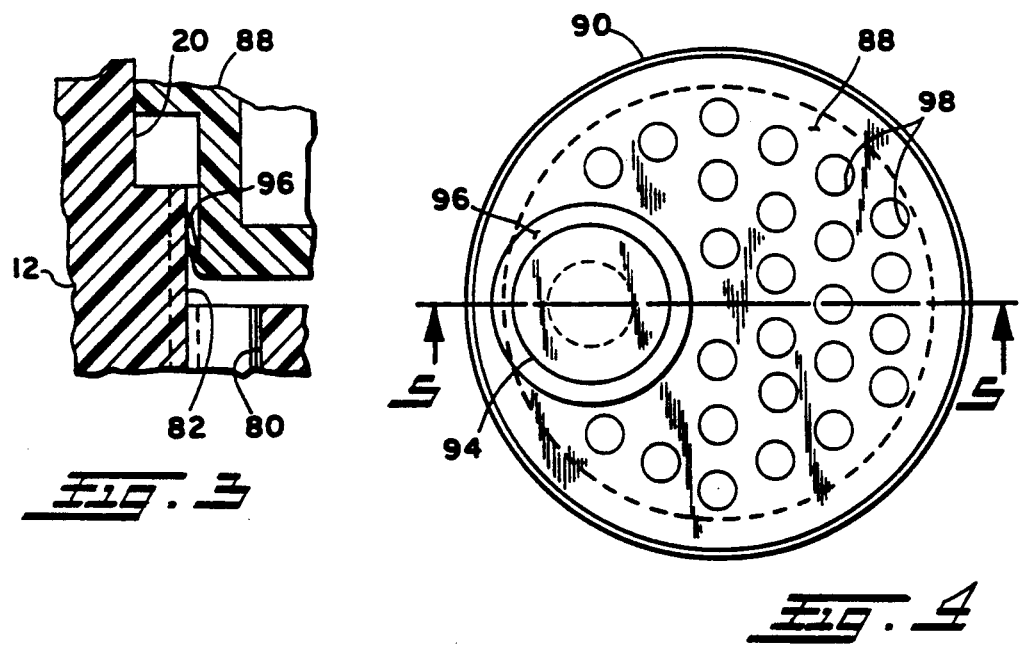
Fig. 3
Fig. 4
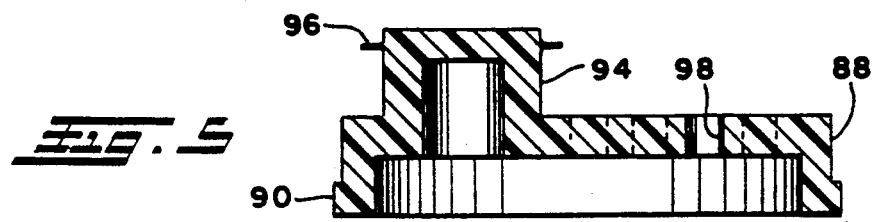
Fig. 5

PILOT OPERATED ELECTRICALLY ACTUATED VALUE ASSEMBLY

BACKGROUND OF THE INVENTION

The present invention relates to electrically operated valves, and particularly valves for controlling water inlet flow to appliances. The invention particularly relates to valves employed for controlling water inlet flow to clothes washing machines and dishwashers.

In such household appliance applications, valves of this type typically are energized by a programmer/timer which controls the appliance duty cycle; appliances of this latter type usually have relatively high water inlet flow requirements requiring a suitably sized flow area through the valve to provide the required flow at the lower end of the supply pressures usually encountered in residential service, which may be as low as 15 PSIG (103 kPa). When sufficient flow area is provided for the valve at the lower supply pressures encountered in service, the force of the inlet supply pressure acting across the movable valve operator member requires a substantial current flow in an electric operator to effect opening of the valve against the force of the supply pressure. Therefor, it has been the practice in designing appliance water inlet valves to utilize a pilot operator having a small area exposed to the supply pressure. The use of a pilot operator enables a low force electrical actuator to create flow from a pilot chamber which, in turn, creates a pressure imbalance on the main valve operator and allows the integrated force of the pressure differential created thereacross to effect opening of the main valve.

Heretofore, it has been common practice to employ a ferromagnetic pilot valve member in a pilot operated electric appliance water inlet valve, and to effect movement of the pilot valve member by the magnetomotive force generated from an electromagnetic actuator, typically a coil surrounding the pilot valve member. In order to effectively utilized an electromagnetically actuated pilot valve, it is necessary to have a portion of the pilot valving chamber formed as a guide such as a tubular guide for directing the movement of the pilot valve between its open and closed positions. In such an arrangement, the limited clearance between the pilot valve member and its surrounding guide has created problems where sand or other foreign particles in the water supply become lodged between the pilot valve member and its guide, thereby rendering the pilot valve immovable in either the closed or open position, in the case where the pilot valve is immobilized in the open position, flooding of the appliance and the surrounding premises can be the result.

Heretofore, pilot operated electric appliance inlet valves have employed a flexible diaphragm as the main valve member. It is known in such a valve to use a rigid insert disposed centrally through the diaphragm and also it is known to have the pilot flow passage formed through the insert with the pilot valve seat provided on the insert on one side of the diaphragm. Where this arrangement is employed, movement of the main valve member upon opening causes relocation of the pilot valve seat. In turn, this requires that the movement of the diaphragm insert be guided in order to maintain the pilot valve seat aligned with respect to the pilot valve member to insure accurate closing of the pilot valve member upon de-energization of the electromagnetic actuator. Thus, it has been desired to provide a way or means of providing guidance for the diaphragm insert which forms the pilot valve seat, and yet prevent lodging of the insert in the guide in the presence of foreign particles such as sand.

Heretofore, in pilot operated electric inlet valves, it has been the practice, where a flexible diaphragm is employed for the main valve operator, to provide replenishment flow to the pilot valving chamber through one or more bleed-flow holes having very small diameter formed through the diaphragm and insert. This arrangement has proven to be troublesome and a source of clogging by foreign particles such as sand, which may be present in the water supply. Furthermore, it has proven to be extremely difficult and costly to manufacture in high volume production the flexible diaphragms with the precision control of the small bleed holes for controlled flow through the flexible diaphragm to replenish the pilot chamber.

Therefor, it has long been desired to provide a way or means of providing bleed flow to the pilot valving chamber remote from the flexible diaphragm valve member. It has also been desired to provide adequate filtering of the bleed flow to the pilot chamber to prevent clogging due to foreign particles such as sand in the water supply.

SUMMARY OF THE INVENTION

The present invention provides a unique and novel pilot operated electric water inlet valve having an elastomeric main valve operator with a pilot flow passage formed in a rigid insert disposed through the diaphragm. An electromagnetically actuated pilot valve member operates to effect pilot flow from a pilot chamber, which creates a pressure differential across the main valve for pausing opening thereof. The valve assembly of the present invention employs a rigid insert for the main valve diaphragm having a raised tower portion thereon, with the pilot flow passage formed centrally therethrough, and with the pilot valve seat provided thereon. The surrounding pilot valve guide forms a portion of the wall of the pilot valving passage, and has a small diameter tubular portion for guiding the pilot valve member. An enlarged bell-mouthed portion of the guide provides for sealing about the diaphragm. The enlarged portion has additional guide means provided thereon for separately guiding movement of the main valve member.

The valve assembly of the present invention has the bleed flow passage for supplying the pilot valving chamber provided remotely from the main valve member through a sidewall portion of the enlarged diameter portion of the guide member. The inlet supply to the bleed passage is provided through a cross passage communicating with a collector groove about the guide member, which cross passage has provided therearound a plurality of circumferentially spaced grooves with a resilient member received therein to provide the flow to the bleed passage exclusively through the grooves. This novel arrangement provides filtering and entrapment of foreign particles such as sand upstream of the bleed passage.

The present invention thus provides a unique and novel valve construction which is resistant to the disabling effects of sand and other foreign particles which may enter the valve from the water supply to which the valve is connected.

BRIEF DESCRIPTION OF THE DRAWINGS

FIG. 2 is a portion of a section view taken along section indicating lines 2—2 of FIG. 1;

FIG. 3 is a section view taken along section-indicating lines 3—3 of FIG. 2;

FIG. 4 is a plan view of the disc member for the inlet; and,

FIG. 5 is a section view taken along section-indicating lines 5—5 of FIG. 4.

DETAILED DESCRIPTION

Figure 1:
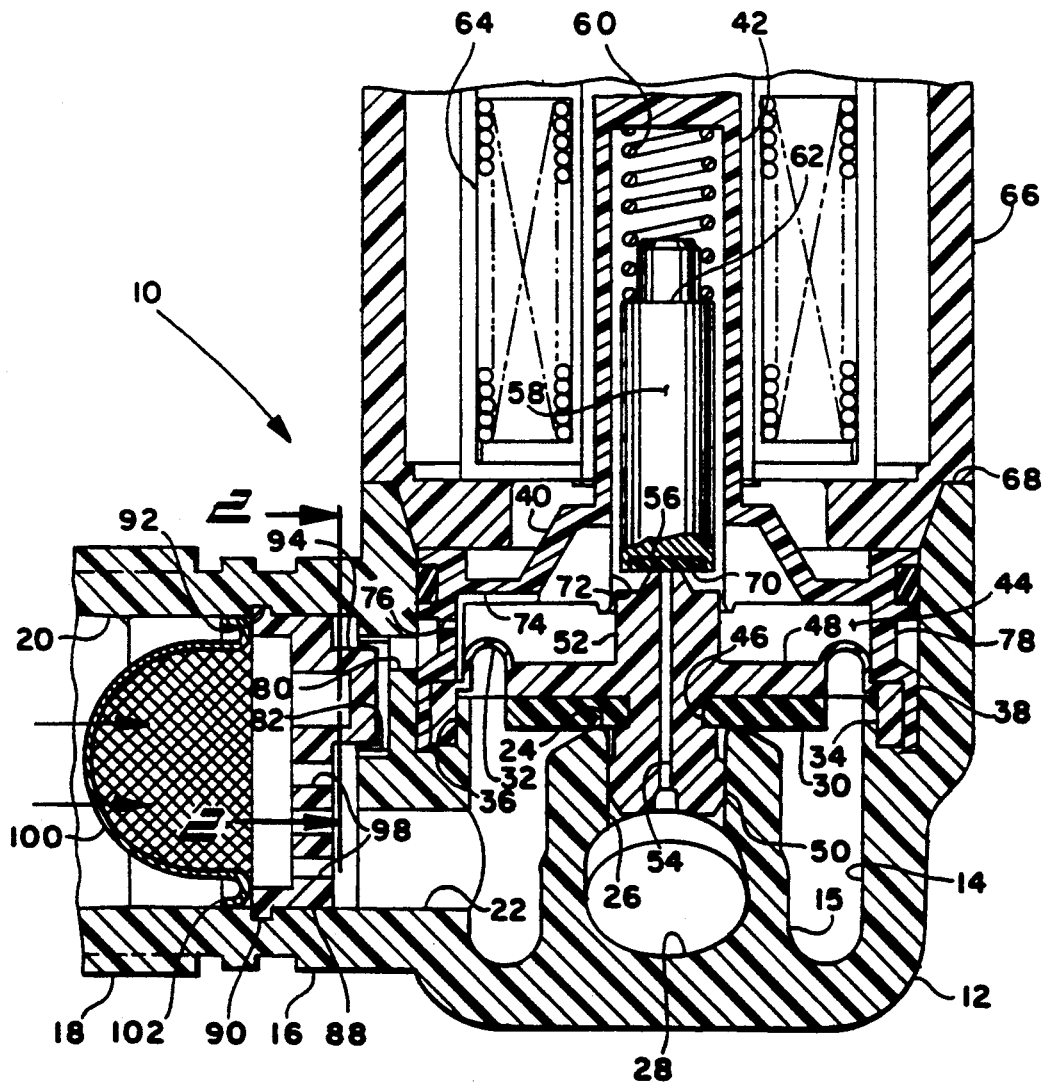
FIG. 1 is a cross-section of the valve assembly of the present invention.

Referring now to FIG. 1, the valve assembly is indicated generally at 10, and has a body 12 defining a generally annular main valving cavity 14 about stanchion 15, and having a boss 16 provided thereon, having external threads 18 provided thereon for attachment to a supply line. The boss 16 has provided therein a fluid inlet passage 20, which communicates with cross passage 22 for connecting the inlet to the valving cavity 12. The annular valving cavity 12 has disposed centrally therein a main valve seat 24 which is disposed at one end of particle passage 26, which communicates with outlet passage 28.

The main valving chamber 12 is closed by the main valving member comprising the central portion 30 of an elastomeric diaphragm 32 having the outer periphery thereof in the form of an annular bead 34 which is sealed in groove 36 provided in the body. An enlarged diameter portion 38 of a guide member 40 is received over the outer periphery of the bead 34, and seals and retains the bead 34 in the groove 36. The guide member 40 has an upper smaller diameter closed end tubular portion 42 which cooperates with the enlarged diameter portion of guide member 40 to provide a pilot valving chamber 44 in the region above the diaphragm 32.

Diaphragm 32 has an aperture 46 formed in the central portion 30 thereof, which has a rigid insert 48 with a downwardly extending pilot portion 50, which extends into the vertical passage 26 for locating and guiding the movement of the diaphragm and insert. Insert 48 has an upwardly extending tower portion 52 which has a pilot passage 54 extending downwardly centrally therethrough, and communicating with the outlet 28. A pilot valve seat 56 is formed on the upper end of the tower portion 52 about the passage 54.

A pilot valve operator 58 is slidably received in the smaller diameter portion 42 of the guide. In the presently preferred practice, the pilot operator 58 is formed of ferromagnetic material and is biased downwardly by the lower end of spring 60 registering against the shoulder 62 provided in the member 58. The upper end of spring 60 registers against the end of tube 42. The guide tube 42 is surrounded by an electromagnetic coil 64, which is suitably potted in the cup-shaped member 66. Member 66 is attached to the body 12 by any suitable expedient as, for example, non-metallic weldment about parting line 68.

Pilot operator 58 has an elastomeric pilot valve member or pad 70 provided on the lower end thereof, which member contacts the pilot valve seat 56 for shutting off flow to the pilot passage 54 when the operator is not magnetically moved.

The guide member 40 has a plurality of circumferentially spaced vanes or flutes 72 provided therearound and extending downwardly an amount sufficient to engage the end of the insert tower 52 for providing guidance to the tower 52 as it is moved upwardly with the valve member 30. The spaces between the flutes 72 provide for flow water from chamber 44 over valve seat 56 when the pilot operator 58 is raised upwardly by energization of coil 64.

The arrangement of the present invention thus provides for location and slidable guiding of the valve member 30 and insert 48 during upward movement thereof, without bringing the tower 52 to enter small diameter portion of tube 42, thereby reducing the tendency of fine foreign particles causing the tower 52 to be lodged in the guide tube and rendered immobile therein.

A groove 74 is provided on the undersurface of the guide 40 to intersect a pilot bleed hole 76 provided through the side wall of the armature guide. The groove 74 for continuously supplying chamber pilot 44 when the diaphragm is moved upwardly against the undersurface of guide 40. It will be understood that the area of bleed hole 76 is necessarily less than that of the area of pilot passage 54 to permit the water to exit the pilot chamber 44 more rapidly than it is supplied through the bleed hole 76 for creating a pressure differential across the upper and lower surface of diaphragm 32. The enlarged diameter portion 38 of armature guide 40 has a collector groove 78 formed circumferentially thereabout for communicating with the pilot bleed hole 76, which collector groove also communicates with the cross-passage 80 provided in the body, and which communicates with the fluted inlet aperture 82.

Referring to FIGS. 2 and 3, the fluted aperture 82 is shown as formed by a plurality of circumferentially spaced axially extending grooves 84 provided therein, with the regions between the grooves 84 forming a plurality of radially inwardly extending ribs or flutes 86.

Referring to FIGS. 1, 2, and 3, a rigid insert 88 having a generally disc-like configuration is received in inlet 20, and retained therein by suitable snap-locking engagement as, for example, by peripheral annular rib 90 thereon engaging a corresponding groove 92 formed in the wall of inlet passage 20.

The insert member 88 has a generally cylindrical portion 94 extending therefrom, and which has a radially outwardly extending flange portion 96 having a relatively thin axial dimension with respect to its radial extent. Flange 96 is axially deformable upon insertion of the cylindrical portion 94 in the ribbed aperture 82, as illustrated in FIG. 3. In the present practice of the invention, the disc-like member 88 is formed of plastic material. Flange 96 is formed of material sufficiently plasticized to permit deformation upon insertion of member 88 in passage 20 and portion 94 in passage 82; and, provides sealing about the inner periphery of the ribs 86. A plurality of spaced apertures of predetermined size, denoted by the reference numeral 98 in FIG. 1, are formed in the member 88. Apertures 98 permit communication from the inlet 20 with the cross passage 22, and to the grooves 84 provided in the aperture 82 to supply flow to passage 80 and the bleed port 76.

Referring to FIGS. 4 and 5, the disc-like member 88 is shown in its unassembled state, wherein the resilient deformable sealing lip 96 is shown undeformed prior to insertion of member 88 in inlet 20. In the presently preferred practice, a dome-shaped, woven mesh metallic screen 100 is received in the inlet passage 20, and has a rolled or turned up peripheral edge 102 which frictionally engages the wall of inlet 20 for retaining the screen therein. Typically, the screen 100 will have finer mesh openings than the apertures 98 in the disc-like member 88, although the reverse arrangement may also be used.

The present invention thus provides a unique and novel pilot operated electrically actuated appliance inlet valve having a plurality of filtering passages in the form of grooves provided around inlet passages for supplying a remote bleed aperture which provides limited flow of water to the pilot valving chamber. The cover for the pilot valving chamber comprises a tubular guide having the armature operator for the pilot valve slidably received therein, and further having thereon a plurality of spaced ribs for providing guidance for the movement of the main valve member. The valve assembly of the present invention thus has a unique resistance to the damaging effects of foreign particles such as sand which may pass through the inlet filters.

Although the valve of the present invention has been described hereinabove with respect to the illustrated embodiments, it will be understood that the invention is capable of modifications and variations by those having ordinary skill in the art, and is intended as limited only by the following claims.

We claim:

1. A pilot operated electrically actuated valve assembly comprising:
   (a) body means defining a main valving cavity having an inlet and an outlet communicating therewith and a main valve seat disposed between said inlet and outlet;
   (b) a movable main valve means including a flexible diaphragm disposed in said cavity for movement between closed position contacting said main valve seat and an open position spaced from said valve seat, said main valve means operable in said closed position to block flow between said inlet and said outlet and in said open position to permit flow between said inlet and outlet;
   (c) means defining a pilot valving cavity having said main valve means forming a portion thereof and a rigid insert in said diaphragm having a pilot outlet port therein communicating with said body means outlet;
   (d) a pilot valve member disposed in said pilot valving cavity and movable between a first position closing said pilot outlet port and a second position opening said pilot outlet port;
   (e) cover means including first guide means forming a portion of the wall of said pilot valving cavity and operative for guiding said movement of said pilot valve member, said cover means defining a bleed port communicating between said inlet and said valving cavity, said bleed port providing a lesser flow area than said pilot outlet port;
   (f) electromagnetic means operable upon energization and de-energization to move said pilot valve means to move between said first and second position for effecting consequent opening and closing of said main valve member; and,
   (g) said cover means includes an enlarged diameter portion having second guide means extending inwardly therefrom operable to contact said rigid insert in said diaphragm and provide guidance for said movement of said main valve means.

2. The valve assembly defined in claim 1, wherein said main valve means includes certain surfaces of a flexible diaphragm contacting said main valve seat.

3. The valve assembly defined in claim 1, wherein said main valve means comprises an elastomeric diaphragm having a thickened central portion.

4. The valve assembly defined in claim 1, wherein said cover means includes a distributor groove extending along portions of said pilot cavity and having said bleed port formed therein.

5. The valve assembly defined in claim 1, wherein said cover means comprises a unitary member having said first and second guide means formed integrally therewith.

6. The valve assembly defined in claim 1, wherein said main valve means includes a flexible diaphragm having a rigid insert in the central region thereof with said pilot port formed therethrough, said insert having portions thereof contacting and guided for movement by said second guide means.

7. The valve assembly defined in claim 1, wherein said body means inlet includes a first passage supplying said bleed port and a second passage supplying said main valving cavity; and, filter means comprising an integrally formed member having separate portions thereof operable to provide different filtering for said first and second passages.

8. The valve assembly defined in claim 1, wherein said inlet has a first passage exclusively supplying said pilot bleed port and a second passage exclusively supplying said main valving cavity; and, said first passage has a plurality of circumferentially spaced grooves therein with a resiliently deformable member received in said passage for directing all flow to said bleed port through said grooves.

9. The valve assembly defined in claim 1, wherein said inlet has a passage exclusively supplying said pilot port said passage having a plurality of circumferentially spaced grooves formed therein and a resilient member received in said passage for directing flow to said pilot port exclusively through said grooves.

* * * * *